United States Patent
Dighrasker et al.

(10) Patent No.: US 8,957,542 B2
(45) Date of Patent: Feb. 17, 2015

(54) NON-ISOLATED AC-DC CONVERTER HAVING A POSITIVE OUTPUT BUCK-BOOST CONVERTER AND PFC AT INPUT SUPPLY

(75) Inventors: Milind Dighrasker, Karnataka (IN); Damir Klikic, Waltham, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 690 days.

(21) Appl. No.: 13/194,223

(22) Filed: Jul. 29, 2011

(65) Prior Publication Data

US 2013/0026836 A1 Jan. 31, 2013

(51) Int. Cl.
*H02J 3/02* (2006.01)

(52) U.S. Cl.
USPC .......................................................... 307/2

(58) Field of Classification Search
USPC ....................................................... 307/2, 64
See application file for complete search history.

(56) References Cited

U.S. PATENT DOCUMENTS

| | | | |
|---|---|---|---|
| 7,402,921 B2* | 7/2008 | Ingemi et al. | 307/64 |
| 7,705,489 B2 | 4/2010 | Nielsen et al. | |
| 7,759,900 B2 | 7/2010 | Samstad | |
| 2003/0231518 A1* | 12/2003 | Peng | 363/98 |
| 2008/0061628 A1 | 3/2008 | Nielsen et al. | |
| 2009/0251106 A1 | 10/2009 | Samstad | |
| 2012/0112547 A1* | 5/2012 | Ghosh et al. | 307/66 |
| 2012/0175958 A1 | 7/2012 | Dighrasker et al. | |
| 2013/0027126 A1 | 1/2013 | Jayaraman et al. | |
| 2013/0049699 A1 | 2/2013 | Jayaraman et al. | |
| 2013/0169064 A1* | 7/2013 | Park et al. | 307/112 |

OTHER PUBLICATIONS

International Search Report from corresponding PCT/US2012/048322 mailed Nov. 12, 2012.
Wang, Wei et al., "A novel bridgeless buck-boost PFC converter," PESC 2008, IEEE, Piscataway, NJ, USA, Jun. 15, 2008 pp. 1304-1308, XP031300151, ISBN: 978-1-4244-1667-7.
Written Opinion of the International Searching Authority from corresponding PCT/US2012/048322 mailed Nov. 12, 2012.

* cited by examiner

*Primary Examiner* — Robert L. Deberadinis
(74) *Attorney, Agent, or Firm* — Lando & Anastasi, LLP

(57) ABSTRACT

A power converter includes a battery having a positive terminal and a negative terminal, a first power input to receive AC input power, a second power input to receive DC input power from the battery, a first power output to charge the battery, a second power output to provide power to a load, a rectifier circuit coupled to the first power input, and a non-isolated single-stage power conversion circuit having an input and configured as a buck-boost converter. The power at the second power output is derived from the first power input and/or the second power input. The single-stage power conversion circuit is configured to convert an AC voltage to a DC voltage using a common energy storage element, and is coupled to the first power output and the rectifier circuit.

16 Claims, 6 Drawing Sheets

NON-ISOLATED AC-DC CONVERTER HAVING A POSITIVE OUTPUT BUCK-BOOST CONVERTER AND PFC AT INPUT SUPPLY

BACKGROUND OF THE INVENTION

1. Field of Invention

Embodiments of the invention relate generally to power conversion, and more particularly, to charging a battery in an uninterruptible power supply system.

2. Discussion of Related Art

An uninterruptible power supply (UPS) is used to provide backup power to an electrical device, or load, when the primary power source, or mains, fails. Typical loads include computer systems, but other loads, such as heating/cooling/ventilation systems, lighting systems, network switches and routers, and security and data center management systems may also be powered by a UPS. A UPS designed for data center or industrial use may provide backup power for loads of between 1 and 20 kVA for several hours.

A UPS unit typically includes one or more batteries as a power source when AC mains power is unavailable. DC power provided by the battery is converted to AC power by a power converter circuit, which in turn is provided to the load. A battery charger, which converts AC power to DC power, may be included in the UPS to charge the battery when AC mains is available to ensure that backup power will be available when needed. The UPS may also include a control unit for automatically managing the operation of the UPS and the power conversion functions.

SUMMARY OF THE INVENTION

According to one embodiment, a power converter includes a battery having a positive terminal and a negative terminal, a first power input to receive AC input power, a second power input to receive DC input power from the battery, a first power output to charge the battery, a second power output to provide power to a load, a rectifier circuit coupled to the first power input, and a non-isolated single-stage power conversion circuit having an input and configured as a buck-boost converter. The power at the second power output is derived from the first power input and/or the second power input. The single-stage power conversion circuit is configured to convert an AC voltage to a DC voltage using a common energy storage element, and is coupled to the first power output and the rectifier circuit.

In another embodiment, the power converter may include a control circuit coupled to the single-stage power conversion circuit and configured to control the power conversion circuit to provide power factor correction at the first power input.

In another embodiment, the positive terminal of the battery may be coupled to the power output, and the negative terminal of the battery may be coupled to a neutral line of the first power input.

In another embodiment, the power converter may include a DC bus, having a DC voltage value, coupled to the input of the single-stage power conversion circuit and to the rectifier circuit. The power converter may be configured to clamp an input voltage of the single-stage power conversion circuit to the DC voltage value. In another embodiment, the power converter may include a pair of diodes interposed between the input of the single-stage power conversion circuit and the DC bus. In yet another embodiment, the power converter may include a power correction factor boost converter circuit coupled to the first power input and the DC bus and configured to convert the AC input power to DC power at the DC bus.

In another embodiment, the rectifier circuit may include a bridge rectifier. In another embodiment, the power converter may include a capacitive element coupled to the rectifier circuit and the input of the power conversion circuit. The power converter may be configured to filter an input voltage of the power conversion circuit.

In another embodiment, the rectifier circuit may include a bridge rectifier having a positive terminal and a negative terminal. The positive terminal of the battery may be coupled to the first power output and the negative terminal of the battery may be coupled to the negative terminal of the rectifier. In another embodiment, the power converter may include a capacitive element coupled to the rectifier circuit and the input of the power conversion circuit. The power converter may be configured to filter an input voltage of the power conversion circuit.

According to one embodiment, a power converter includes a battery, a first power input to receive AC input power, a second power input to receive DC input power from the battery, a first power output to charge the battery, a second power output to provide power, derived from at least one of the first power input and the second power input, to a load, a rectifier circuit coupled to the first power input, and means coupled to the rectifier circuit for converting an AC voltage to a DC voltage at the first power output.

In another embodiment, the power converter may include a control circuit coupled to the means for converting the AC voltage to the DC voltage. The power converter may be configured to control the power converter such that power factor correction is performed at the power input.

In another embodiment, the battery may have a positive terminal coupled to the first power output and a negative terminal coupled to a neutral line of the first power input.

In another embodiment, the rectifier circuit may include a bridge rectifier having a positive terminal and a negative terminal. The battery may have a positive terminal coupled to the first power output and a negative terminal coupled to the negative terminal of the rectifier.

According to another embodiment, a method of charging a battery includes receiving, at an input of a non-isolated single-stage buck-boost circuit, a rectified AC input voltage, converting the rectified AC input voltage into a DC output voltage using the buck-boost circuit, charging the battery using the DC output voltage, providing an AC output voltage derived from at least one of the rectified AC input voltage and the DC output voltage, and operating a plurality of switches of the buck-boost circuit to provide power factor correction at the AC power input.

In another embodiment, the method may include clamping a voltage inputted to the input of the buck-boost circuit using a DC clamp circuit.

In another embodiment, the method may include turning each of the plurality of switches off when a current through an inductor of the buck-boost circuit reaches a predetermined peak value, and turning each of the plurality of switches on when the current through the inductor is zero.

In another embodiment, the plurality of switches may be operated using an average current mode control to control a current in the buck-boost circuit.

In another embodiment, the battery may have a negative terminal coupled to a neutral line of the AC power input. In yet another embodiment, the negative terminal of the battery may be coupled to a negative terminal of the rectifier circuit.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
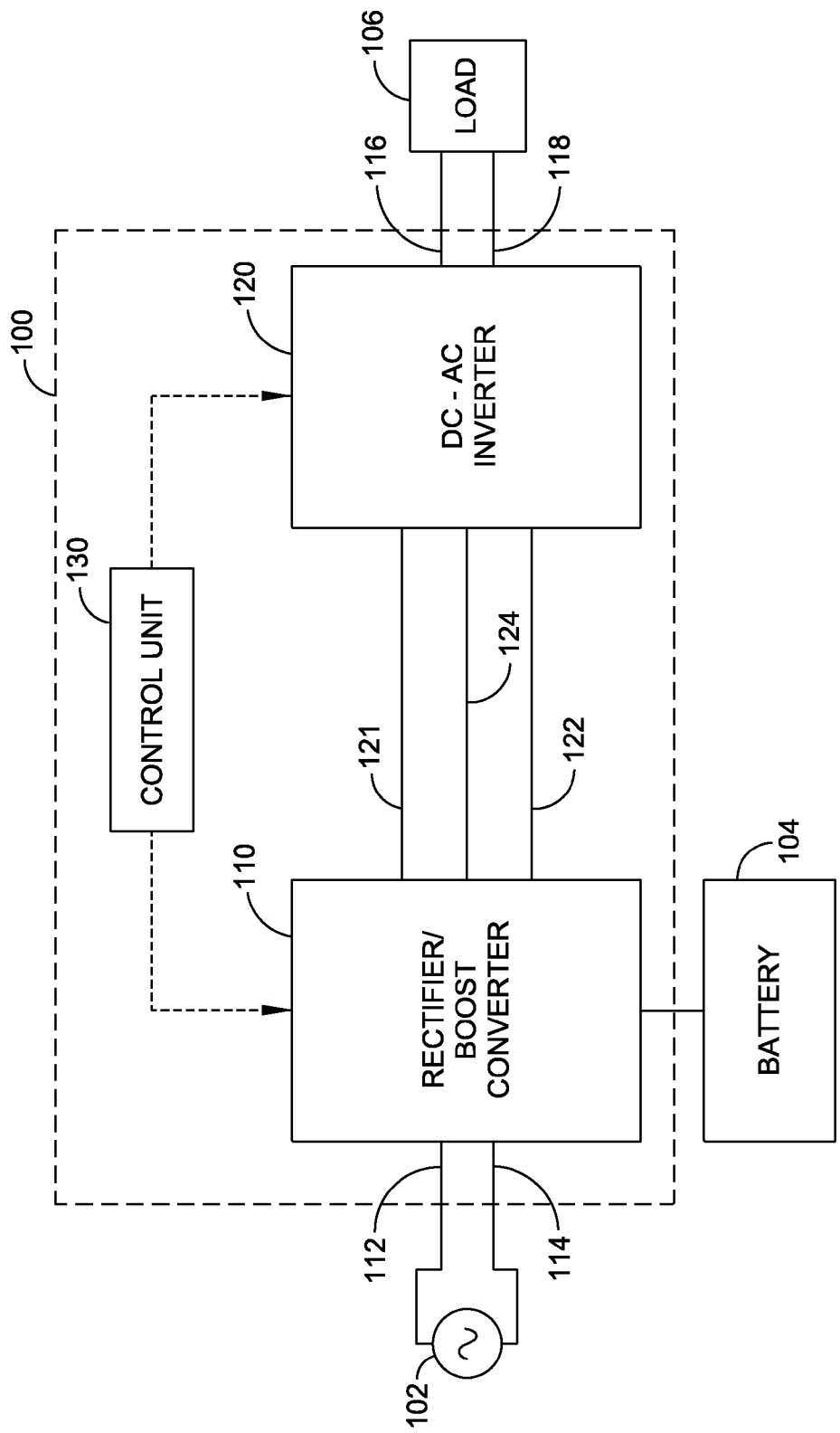
FIG. 1 is a functional block diagram of an uninterruptible power supply in accordance with one embodiment of the present invention.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various embodiments of the present disclosure relate to power conversion for an uninterruptible power supply (UPS), including power distribution to load such as a battery or other power storage device, for example, to charge the battery. Embodiments of the present disclosure are not limited for use in UPS's and may be used with other power supplies or power systems generally.

As will be understood by one of skill in the art, the ratio of real power to apparent power in an AC power system is called the power factor. Where the power factor is less than unity (1), the load is considered to have reactive properties that cause some of the power drawn by the load to be returned to the power system, which is often wasted as heat. Therefore, it is desirable that the power conversion system provide for power factor correction (PFC), which increases the power factor at the AC mains input by actively controlling the amount of power consumed by the load.

Some loads, including, for example, a battery in a UPS, require fixed DC voltages across them and controlled currents through them. Depending on its power rating, the UPS system may use batteries from, for example, 48 VDC to 240 VDC. However, the AC mains input voltage peak typically varies between 140V and 415V (for an RMS voltage of 100 VAC to 290 VAC). Therefore, a boost converter (which outputs a voltage greater than the input voltage) is not suitable for charging the battery and achieving power factor correction at the input because the AC mains input voltage may exceed the battery voltage. Buck converters are one efficient way to reduce, or step-down, the input voltage, but they are typically combined with a boost converter to account for the portions of the AC input voltage that are less than battery voltage. There are known techniques for charging the battery using a single stage converter, for example, with an isolated buck-boost converter. However, the isolated buck-boost converter requires an isolation transformer, which increases the manufacturing costs of the UPS and is advantageous only when the charger power is less than 500 W. Furthermore, many UPS use a floating battery scheme where the negative terminal is not connected to the neutral line of the AC mains input. In this case, maintaining power factor correction without using an isolation transformer is challenging.

In some conventional on-line UPS systems, the battery charging function is provided either directly from AC mains through an AC-DC converter or directly from a split DC bus through a DC-DC converter. In one approach, the AC-DC charger typically includes a boost converter requiring a separate, dedicated DC bus. Such a charger could be isolated or non-isolated depending on whether the negative terminal of the battery is connected to AC mains supply neutral or floating. In a second approach, the charging power is taken from the split DC bus after the PFC conversion stage, and typically uses a high frequency transformer, an isolated buck converter, or a high frequency non-isolated buck converter. Both approaches suffer from additional complexity, higher cost and lower efficiency, as well as operational input voltage range limitations in the case of non-isolated topologies. The second approach has an additional disadvantage of requiring the PFC conversion stage to be sized for a higher charging power.

At least some embodiments of the present disclosure include a PFC AC-DC conversion stage and a battery charger combined in a manner that avoids processing the charging power through the PFC stage, as is commonly done in conventional on-line UPS systems, while achieving a high power factor with high efficiency and low cost. Some embodiments include a single-stage AC-DC battery charger based on the buck-boost converter approach, which has lower complexity, higher efficiency, higher power density, and lower cost, and which can provide high charging power with PFC as compared to conventional techniques.

FIG. 1 is a block diagram of a UPS 100 according to one embodiment. The UPS 100 provides regulated power to a load 106 from either an AC power source 102 or a backup power source, such as a battery 104. The UPS 100 includes a rectifier/boost converter 110, an inverter 120, and a control unit 130 for controlling the rectifier/boost converter and the inverter. The UPS has a line (or phase) input 112 and a neutral input 114 of the AC power source 102, and a line output 116 and a neutral output 118 each coupled to the load 106.

In line mode of operation, under control of the control unit 130, the rectifier/boost converter 110 converts the input AC voltage into positive and negative DC voltages at a positive DC bus 121 and a negative DC bus 122, respectively. The positive DC bus 121 and the negative DC bus 122 may, for example, each be rated up to +/−400 VDC. The rectifier/boost converter 110 includes a common or neutral line 124. The neutral line 124 may be coupled to the input neutral 114 and the output neutral 118 to provide a continuous neutral path through the UPS 100. The rectifier/boost converter 110 also includes a battery charging circuit (not shown) for charging the battery 104 during the line mode of operation. In at least one embodiment, the battery charging circuit is configured as a buck-boost converter that is coupled to the positive DC bus 121, the negative DC bus 122, and the neutral line 124 in a configuration where the negative terminal of the battery is connected to the AC mains supply neutral. In some embodiments, the buck-boost converter is coupled to the negative terminal of a rectifier instead of the neutral line 124.

In backup mode of operation (also called battery mode of operation), upon loss of input AC power the rectifier/boost converter 110 generates the positive and negative DC voltages from the battery 104. In both line and backup modes of operation, the inverter 120 receives the positive DC voltage 121 and the negative DC voltage 122 from the rectifier/boost converter 110. The inverter 120 converts the positive and negative DC voltages into an output AC voltage at lines 116 and 118.

Figure 2:
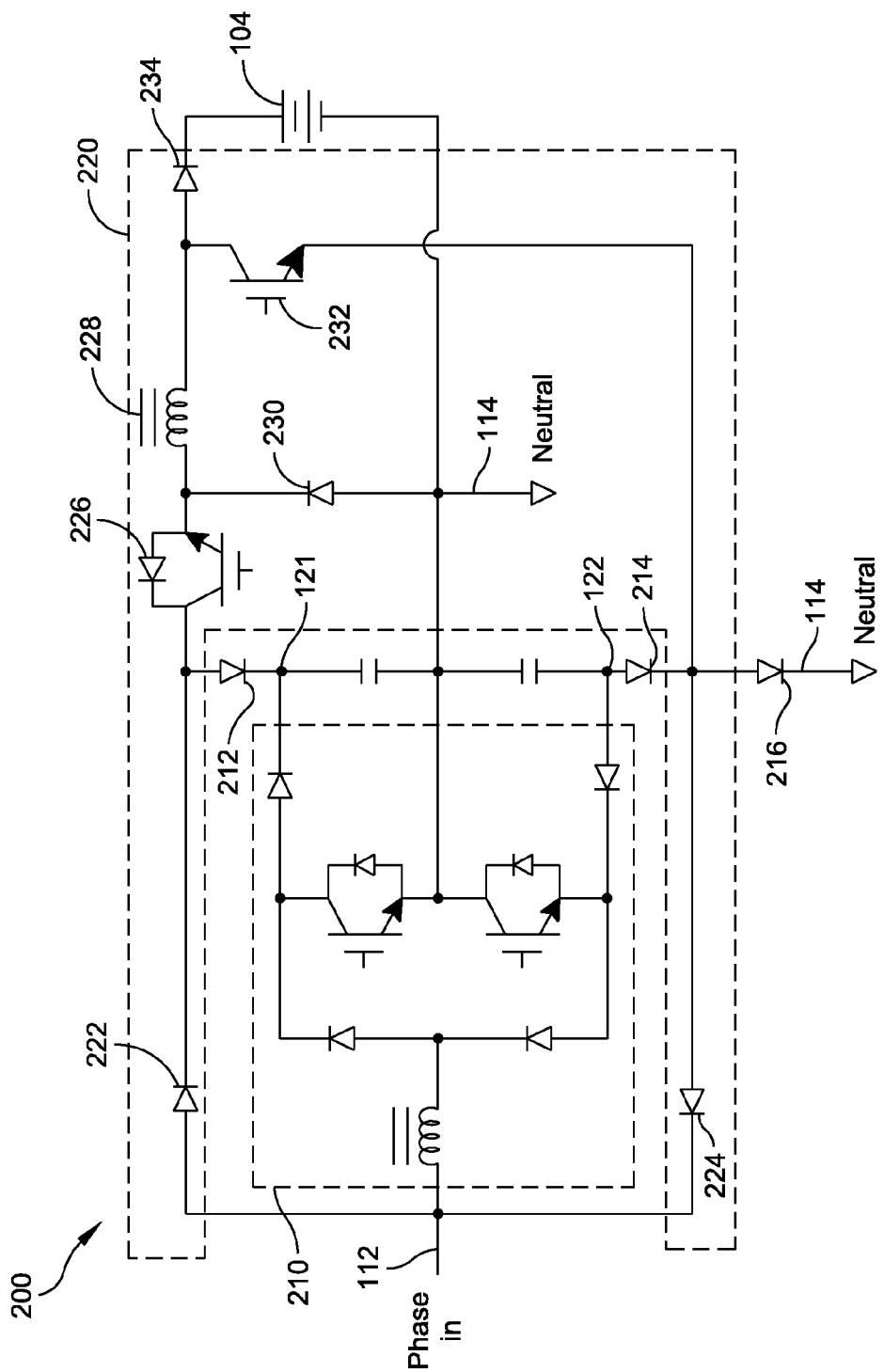
FIG. 2 is a schematic diagram of a power conversion circuit in accordance with one embodiment of the present invention.

According to one embodiment, as illustrated in FIG. 2 below, the UPS includes a power conversion circuit 200 having a power factor correction (PFC) boost converter/rectifier circuit 210 for converting AC mains input power into DC power at the DC bus, including the positive DC bus 121 and the negative DC bus 122, and a charger circuit 220 coupled to the DC bus for charging the battery 104, where the negative terminal of the battery is tied to the neutral line 114 of the AC mains power source. The charger circuit 220 draws power directly from the AC mains power source rather than from the PFC circuit 210, and uses the DC bus as a clamp at the input of the charger circuit. In this manner, the charger circuit 220 is a single-stage converter, as opposed to conventional charger circuits that have two-stage converters where the charger circuit is coupled serially to the PFC rectifier/boost converter circuit through a DC link capacitor. Two-stage converters are less efficient and require more electronic components to operate than the power conversion circuit 200.

The charger circuit 220 includes rectifier diodes 222 and 224 coupled to the line input 112 for rectifying the AC input voltage. A first switch 226, an inductor 228, a first diode 230, a second diode 234, and a second switch 232 form a buck-boost converter circuit portion of the charger circuit 220, which is coupled to the rectifier diodes 222, 224 and the battery 104. The charger circuit 220 is coupled to the DC bus and to the neutral line 114 through diodes 212, 214 and 216.

During a positive half line cycle of the AC mains input, the AC mains input power is transferred through the charger circuit 220 via diodes 222 and 216. As discussed above, the buck-boost converter portion of the charger circuit 220 includes switches 226 and 232, inductor 228, and diodes 230 and 234. Switches 226 and 232 are operated such that each is turned on and off simultaneously at high frequency. When switches 226 and 232 are turned on, the inductor 228 is charged using the energy transferred from the line input 112, through diodes 222 and 216, to the neutral line 114. When switches 226 and 232 are turned off, the energy stored in the inductor 228 is transferred to the battery 104 through diodes 230 and 234.

Assuming all devices are ideal, during one switching cycle, the average voltage across the inductor 228, $V_L$, when switches 226 and 232 are on is $V_P$ during the positive half line cycle of the AC mains input. The voltage $V_L$ when switches 226 and 232 are off is the battery voltage $V_{BATT}$. Assuming the duty cycle of switches 226 and 232 is D and using the volt-second balance principle for the inductor 228, $$V_P * D = V_{BATT} * (1-D)$$

or, $$V_P/V_{BATT} = (1-D)/D$$

(i.e., $V_{IN}/V_{OUT} = (1-D)/D$).

Thus during the positive half line cycle of the AC mains input, the charger circuit 220 functions as a positive output buck-boost converter.

During a negative half line cycle of the AC mains input, the AC mains input power is transferred to the buck-boost converter portion of the charger circuit 220 via diodes 224 and 230. The first switch 226 is idle during the negative half line cycle. The second switch 232 is turned on and off at high frequency. When the second switch 232 is turned on, the inductor 228 is charged using the energy transferred from the neutral line 114, through diode 230, the inductor 228, the second switch 232, and diode 224 to the line input 112. When the second switch 232 is turned off, the energy stored in the inductor 228 is transferred to the battery 104 through diodes 234 and 230.

Again assuming that all devices are ideal, during one switching cycle, the average voltage across the inductor 228, $V_L$, when switch 232 is on is $V_N$ during the negative half line cycle of the AC mains input. The voltage $V_L$ when switches 226 and 232 are off is again the battery voltage $V_{BATT}$. Also assuming the duty cycle of switch 232 is D and using the volt-second balance principle for the inductor 228, $$V_N * D = V_{BATT} * (1-D)$$

or, $$V_N/V_{BATT} = (1-D)/D.$$

Thus, during the negative half line cycle of the AC mains input, the charger circuit 220 again functions as a positive output buck-boost converter.

The buck-boost converter portion of the charger circuit 220 is controlled (e.g., by the control unit 130 of FIG. 1) to provide power factor correction at the AC mains inputs 112 and 114. There may be voltage spikes across switches 226 and 232 because of the inductance in the traces of the printed circuit board, as the input current (e.g., through switches 226 and 232) is discontinuous. A DC link circuit including diodes 212 and 214 functions as a clamp for any voltage spikes across switches 226 and 232. The buck-boost converter may be designed to operate in any range of AC mains input voltages.

Figure 3:
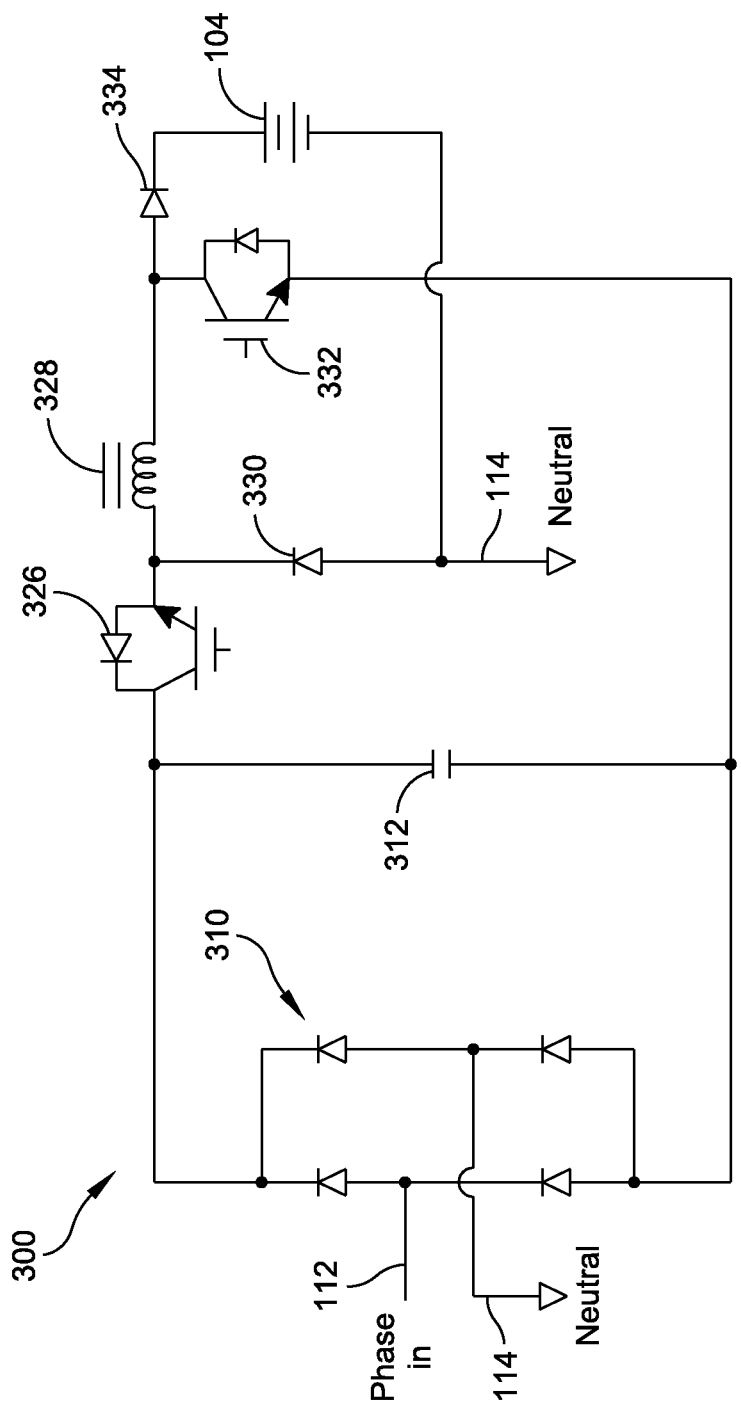
FIG. 3 is a schematic diagram of a power conversion circuit in accordance with another embodiment of the present invention.

FIG. 3 illustrates a charger circuit 300 according to another embodiment. While the power conversion circuit 200 described above with respect to FIG. 2 may be used as a battery charger in conjunction with the PFC converter/rectifier circuit 210, the charger circuit 300 may be used, for example, as a separate charger circuit. The charger circuit 300 includes a full bridge rectifier, generally indicated at 310, at the line input 112 and the neutral line 114, and further includes a filter capacitor 312. The negative terminal of the battery and the first diode 330 are each coupled to the neutral line of the AC mains input. A first switch 326, an inductor 328, a first diode 330, a second diode 334, and a second switch 332 form a buck-boost converter circuit portion of the charger circuit 300, which is coupled to the rectifier 310 and the battery 104.

During a positive half line cycle of the AC mains input, the AC mains input power is transferred to the buck-boost converter portion of the charger circuit 300. The switches 326 and 332 are operated such that each is turned on and off simultaneously at high frequency. When switches 326 and 332 are turned on, the inductor 328 is charged using the energy transferred from the line input 112, through the rectifier 310, the first switch 326, the inductor 328, the second switch 332, to the neutral line 114. When switches 326 and 332 are turned off, the energy stored in the inductor 328 is transferred to the battery 104 through diodes 334 and 330.

During a negative half line cycle of the AC mains input, the AC mains input power is transferred to the buck-boost converter portion of the charger circuit 300 via the rectifier 310. The first switch 326 is idle during the negative half line cycle. The switch 332 is turned on and off at high frequency. When the second switch 332 is turned on, the inductor 328 is charged using the energy transferred from the neutral line 114, through diode 330, the inductor 328, the second switch 332, and the rectifier 310 to the line input 112. When the second switch 332 is turned off, the energy stored in the inductor 328 is transferred to the battery 104 through diodes 334 and 330.

Figure 4:
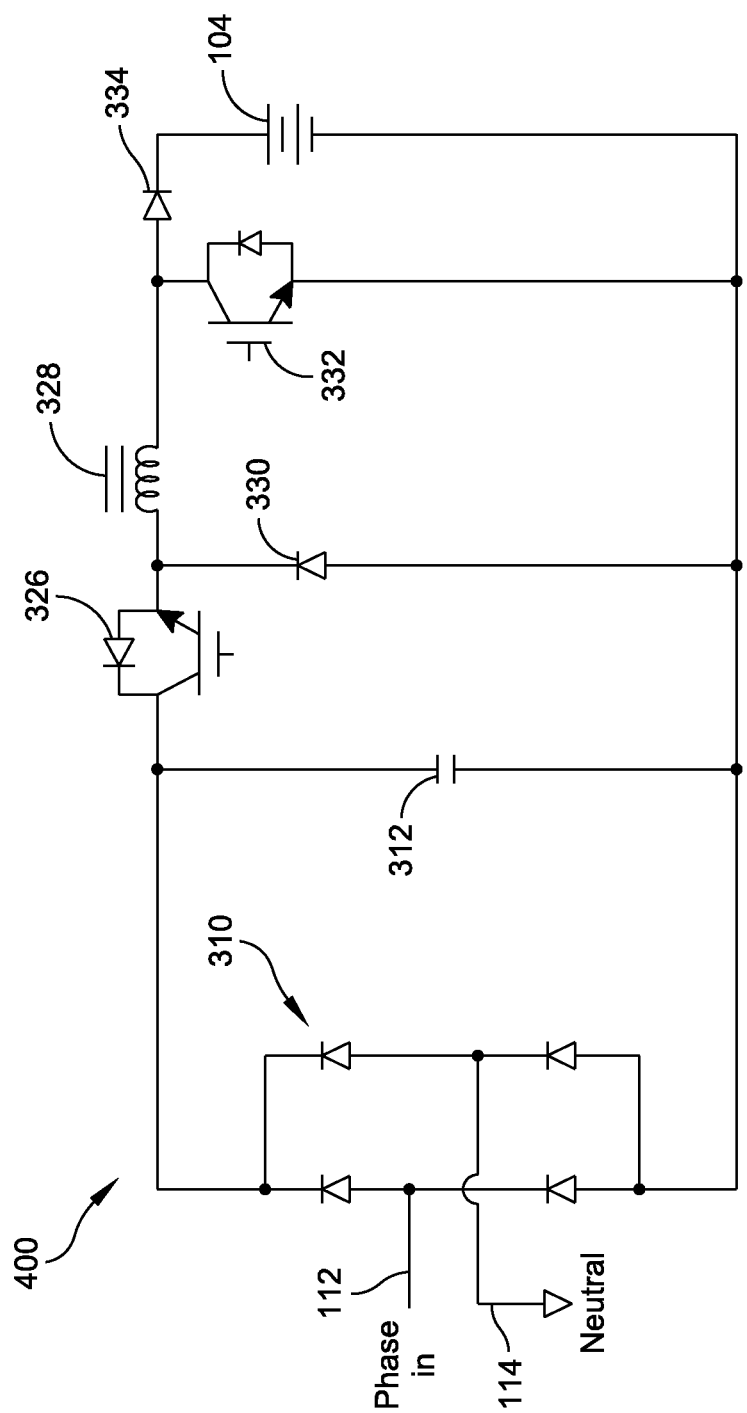
FIG. 4 is a schematic diagram of a power conversion circuit in accordance with yet another embodiment of the present invention.

FIG. 4 illustrates a charger circuit 400 according to yet another embodiment. The charger circuit 400 of FIG. 4 is substantially similar to the charger circuit 300 of FIG. 3, except the battery 104 and the diode 330 are each coupled to the negative terminal of the rectifier bridge 310 rather than to the neutral line 114 of the AC mains input. The operation of the charger circuit 400 is substantially similar to the operation of the charger circuit 300 of FIG. 3, described above, except that during the negative half line cycle, the first switch 326 is turned on and off simultaneously with the second switch 332. When the switches 326 and 332 are turned on, the inductor 328 is charged using the energy transferred from the neutral line 114, through the rectifier 310, the first switch 326, the inductor 328, the second switch 332, and the rectifier 310 to the line input 112. When the switches 326 and 332 are turned off, the energy stored in the inductor 328 is transferred to the battery 104 through diodes 334 and 330.

Figure 5:
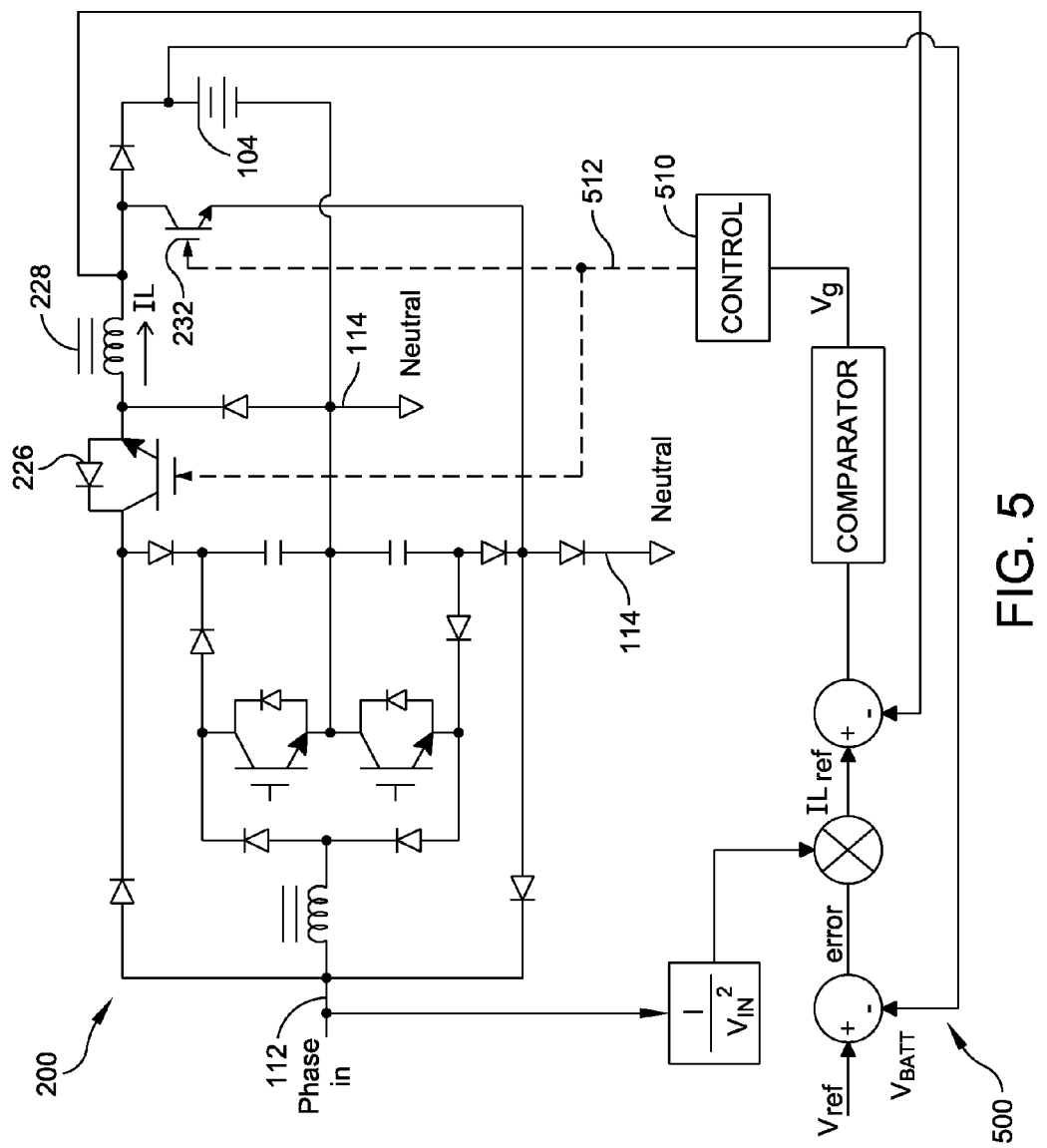
FIG. 5 is a schematic diagram of a control circuit for controlling the power conversion circuits of FIGS. 2, 3, and/or 4.

FIG. 5 illustrates a control circuit 500 for controlling one or more of the above-described circuits, such as the power conversion circuit 200 of FIG. 2, to achieve PFC, according to one embodiment. It should be appreciated that the control circuit 500 may be used with the power conversion circuits 300 and 400 of FIGS. 3 and 4, as well as with other power conversion circuits. A controller 510 in the control loop blocks the gate pulses for the first switch 226 during the negative half line cycle of AC mains input. The current through the inductor 228 is always controlled during the critical conduction mode of the PFC converter. Whenever an inductor current IL through the inductor 228 reaches a pre-determined peak value as compared to a reference current $IL_{ref}$, the gate drive signal 512 to switches 226 and 232 is pulled low. The gate drive signal 512 is pulled high only when the inductor current IL reaches zero. The switching frequency of switches 228 and 232 under this control is variable.

The fundamental component of the input current is in phase with the AC mains supply voltage. Therefore, by controlling the inductor current IL, a unity power factor at the input is achieved. A filter at the input may be used to provide current smoothing.

Figures 6A, 6B:
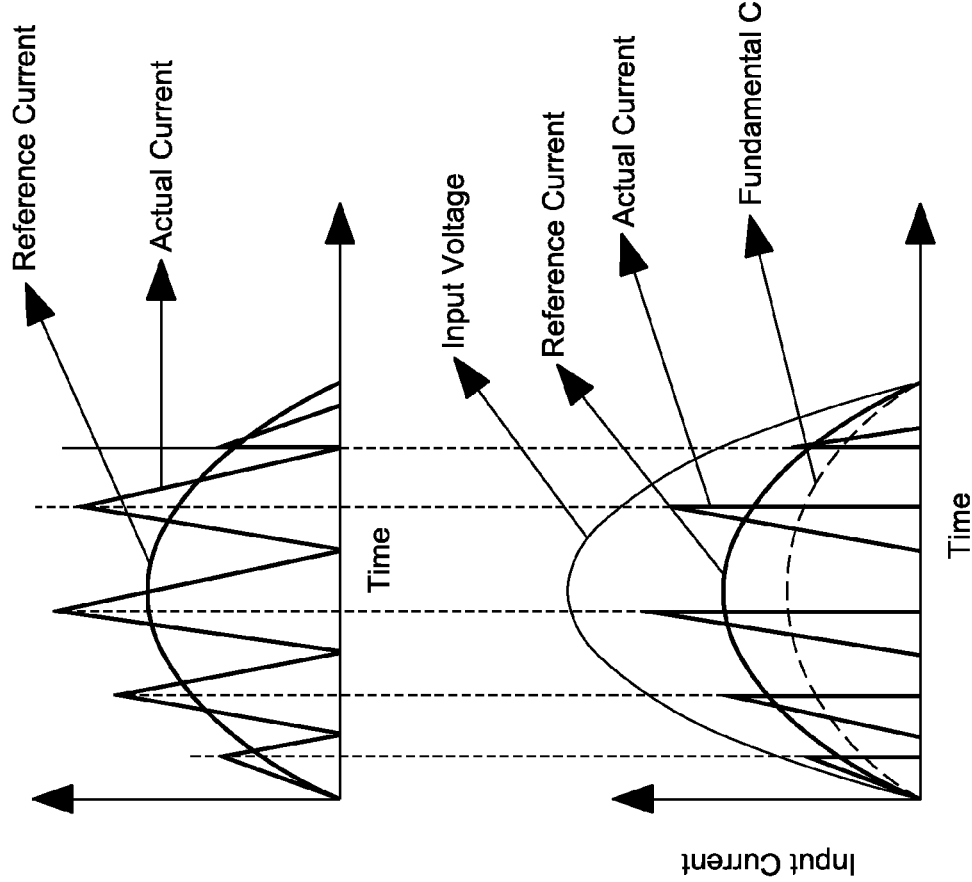
FIGS. 6A-6B are graphs representing an exemplary simulation of a critical conduction mode current control method applied to the power conversion circuit of FIG. 2.

FIGS. 6A-6B are graphs representing an exemplary simulation of a critical conduction mode current control method applied to the power conversion circuit 200 of FIG. 2. FIG. 6A shows the current through the inductor 226, and FIG. 6B shows the input current. In this example, the inductor 228 is rated at 1 mH, the input voltage is 230 VAC (rms), and the output voltage is 240 VDC. Similar results can be achieved with other ratings and voltages, and with other embodiments described herein (such as the power conversion circuit 300 of FIG. 3), as will be appreciated by one of skill in the art.

According to another embodiment, PFC at the input can be achieved in the power conversion circuits 200, 300, and 400 of FIGS. 2, 3, and 4, with a conventional average current mode control of the inductor current using a fixed switching frequency for the switches (e.g., switches 226 and 232, or 326 and 332).

Any of the preceding embodiments can be implemented within a UPS, for example, a UPS having a DC battery as a backup power source. The UPS may be configured to provide backup power for any number of power consuming devices, such as computers, servers, network routers, air conditioning units, lighting, security systems, or other devices and systems requiring uninterrupted power. The UPS may contain, or be coupled to, a controller or control unit to control the operation of the UPS. For example, the controller may provide pulse width modulated (PWM) signals to each of the switching devices within the circuit for controlling the power conversion functions. In another example, the controller may provide control signals for the relays. In general, the controller controls the operation of the UPS such that it charges the battery from the AC power source when power is available from the AC power source, and inverts DC power from the battery when the AC power source is unavailable or during brown-out conditions. The controller can include hardware, software, firmware, a processor, a memory, an input/output interface, a data bus, and/or other elements in any combination that may be used to perform the respective functions of the controller.

In the embodiments described above, a battery is used as a backup power source. In other embodiments, other AC or DC backup sources and devices may be used including fuel cells, photovoltaics, DC micro turbines, capacitors, an alternative AC power source, any other suitable power sources, or any combination thereof. In embodiments of the invention that utilize a battery as a backup power source, the battery may be comprised of multiple batteries of cells coupled in parallel or in series.

In one or more of the preceding embodiments, the switching devices may be any electronic or electromechanical device that conducts current in a controlled manner (e.g., by using a control signal) and can isolate a conductive path. Representations of various switching devices, and other electronic devices, in the figures are exemplary and not intended to be limiting, as it will be appreciated by one skilled in the art that similar or identical functionality may be obtained using various types, arrangements, and configurations of devices. For example, one or more of the switching devices may contain one or more anti-parallel diodes, or such diodes may be separate from the switching devices. As indicated above, in some embodiments, the switching devices include a rectifier, for example, a controlled rectifier that can be turned on and off with the application of a control signal (e.g., an SCR, a thyristor, etc.). Additionally, other devices, such as resistors, capacitors, inductors, batteries, power supplies, loads, transformers, relays, diodes, and the like may be included in a single device, or in a plurality of connected devices.

In the embodiments described above, rectifier/boost circuits are described for use with uninterruptible power supplies, although it should be appreciated that the circuits described herein may be used with other types of power supplies.

Embodiments of the present invention may be used with uninterruptible power sources having a variety of input and output voltages and may be used in single phase or multiphase uninterruptible power supplies.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, the gating pulses used to operate the switching devices of the power converter may vary in frequency, duty cycle, or both. Further, alternative configurations of electrical components may be utilized to produce similar functionality, for example, inverter and charger functions, or other functions. Accordingly, the foregoing description and drawings are by way of example only.

What is claimed is:

1. A power converter, comprising:
a battery having a positive terminal and a negative terminal;
a first power input to receive AC input power;
a second power input to receive DC input power from the battery;
a first power output to charge the battery;
a second power output to provide power, derived from at least one of the first power input and the second power input, to a load;
a rectifier circuit coupled to the first power input; and
a non-isolated single-stage power conversion circuit having an input and configured as a buck-boost converter to convert an AC voltage to a DC voltage using a common energy storage element to charge the battery, the single-stage power conversion circuit coupled to the first power output and, at the input of the power conversion circuit, to the rectifier circuit.

2. The power converter of claim 1, further comprising a control circuit coupled to the single-stage power conversion circuit and configured to control the power conversion circuit to provide power factor correction at the first power input.

3. The power converter of claim 1, wherein the positive terminal of the battery is coupled to the power output and the negative terminal of the battery is coupled to a neutral line of the first power input.

4. The power converter of claim 3, further comprising a DC bus, having a DC voltage value, coupled to the input of the single-stage power conversion circuit and to the rectifier circuit, and wherein the power converter is configured to clamp an input voltage of the single-stage power conversion circuit to the DC voltage value.

5. The power converter of claim 4, further comprising a pair of diodes interposed between the input of the single-stage power conversion circuit and the DC bus.

6. The power converter of claim 5, further comprising a power correction factor boost converter circuit coupled to the first power input and the DC bus and configured to convert the AC input power to DC power at the DC bus.

7. The power converter of claim 3, wherein the rectifier circuit includes a bridge rectifier.

8. The power converter of claim 7, further comprising a capacitive element coupled to the rectifier circuit and the input of the power conversion circuit, and configured to filter an input voltage of the power conversion circuit.

9. The power converter of claim 1, wherein the rectifier circuit includes a bridge rectifier having a positive terminal and a negative terminal, and wherein the positive terminal of the battery is coupled to the first power output and the negative terminal of the battery is coupled to the negative terminal of the rectifier.

10. The power converter of claim 9, further comprising a capacitive element coupled to the rectifier circuit and the input of the power conversion circuit, and configured to filter an input voltage of the power conversion circuit.

11. A method of charging a battery, the method comprising:
receiving, at an input of a non-isolated single-stage buck-boost circuit, a rectified AC input voltage;
converting the rectified AC input voltage into a DC output voltage using the buck-boost circuit;
charging the battery using the DC output voltage;
providing an AC output voltage derived from at least one of the rectified AC input voltage and the DC output voltage; and
operating a plurality of switches of the buck-boost circuit to provide power factor correction at the AC power input.

12. The method of claim 11, further comprising clamping a voltage inputted to the input of the buck-boost circuit using a DC clamp circuit.

13. The method of claim 11, further comprising turning each of the plurality of switches off when a current through an inductor of the buck-boost circuit reaches a predetermined peak value, and turning each of the plurality of switches on when the current through the inductor is zero.

14. The method of claim 11, wherein the plurality of switches is operated using an average current mode control to control a current in the buck-boost circuit.

15. The method of claim 11, wherein the battery has a negative terminal coupled to a neutral line of the AC power input.

16. The method of claim 11, wherein the battery has a negative terminal coupled to a negative terminal of the rectifier circuit.

* * * * *